(12) United States Patent
Munteanu

(10) Patent No.: US 6,821,654 B1
(45) Date of Patent: Nov. 23, 2004

(54) CRMOTA UNDERLAYER

(75) Inventor: Mariana Rodica Munteanu, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/269,872

(22) Filed: Oct. 15, 2002

Related U.S. Application Data

(60) Provisional application No. 60/388,403, filed on Jun. 12, 2002.

(51) Int. Cl.[7] .............................. G11B 5/66; G11B 5/70
(52) U.S. Cl. ..................... 428/694 TS; 428/694 TM; 428/900
(58) Field of Search .................... 428/694 TS, 694 TM, 428/900

(56) References Cited

U.S. PATENT DOCUMENTS

| | | | | |
|---|---|---|---|---|
| 6,280,813 B1 | * | 8/2001 | Carey et al. | 428/65.3 |
| 6,287,429 B1 | * | 9/2001 | Moroishi et al. | 204/192.2 |
| 6,613,460 B1 | * | 9/2003 | Abarra et al. | 428/694 TS |

* cited by examiner

*Primary Examiner*—Holly Rickman
(74) *Attorney, Agent, or Firm*—McDermott Will & Emery LLP

(57) ABSTRACT

High SNR longitudinal magnetic recording media with improved bit error rate are fabricated using a CrMoTa underlayer for uniform magnetic grain size. Embodiments include magnetic recording media comprising a composite underlayer of Cr and $Cr_{100-x-y}Mo_xTa_y$, wherein x is 1 to 20 and y is 1 to 6, and a magnetic layer having a uniform grain size with a standard deviation no greater than 0.4.

19 Claims, 4 Drawing Sheets

Grain Size (nm)
Cr/Cr87Mo10Ta3/Interlayer/AFC structure

CRMOTA UNDERLAYER

FIELD OF THE INVENTION

This application claims priority from Provisional application Ser. No. 60/388,403 filed on Jun. 12, 2002 entitled: "CrMoTa Underlayer" the entire disclosure of which is hereby incorporated by reference herein.

TECHNICAL FIELD

The present invention relates to magnetic recording media, such as thin film magnetic recording disks. The present invention has particular applicability to high areal density longitudinal magnetic recording media exhibiting low noise and enhanced magnetic performance.

BACKGROUND ART

Magnetic recording media are extensively employed in the computer industry and can be locally magnetized by a write transducer or write head to record and store information. The write transducer creates a highly concentrated magnetic field which alternates direction based upon bits of the information being stored. When the local magnetic field produced by the write transducer is greater than the coercivity of the recording medium, grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response to a read sensor, allowing the stored information to be read.

There is an ever increasing demand for magnetic recording media with higher storage capacity and lower noise. Efforts, therefore, have been made to reduce the space required to magnetically record bits of information while maintaining the integrity of the information. The space necessary to record information in magnetic recording media depends upon the size of transitions between oppositely magnetized areas. It is, therefore, desirable to produce magnetic recording media that will support the smallest transition size possible. However, the signal output from the transition must avoid excessive noise to reliably maintain the integrity of the stored information. Media noise is generally characterized as the sharpness of a signal on readback against the sharpness of a signal on writing and is generally expressed as signal-to-noise ratio (SNR) of the medium.

The increasing demands for higher areal recording density impose increasingly greater demands on thin film magnetic recording media in terms of coercivity (Hc), magnetic saturation (Ms), magnetic remanance (Mr), coercivity squareness (S*), SNR, and narrow track recording performance. It is extremely difficult to produce a magnetic recording medium satisfying such demanding requirements.

The linear recording density can be increased by increasing the Hc of the magnetic recording medium, and can be accomplished by decreasing the medium noise, as by maintaining very fine magnetically non-coupled grains. Medium noise in thin films is a dominant factor restricting increased recording density of high density magnetic hard disk drives, and is attributed primarily to inhomogeneous and large grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (HCP) with uniaxial crystalline anisotropy and a magnetization easy direction along the c-axis is in the plane of the film. The better the in-plane c-axis crystallographic texture, the more suitable is the Co alloy thin film for use in longitudinal recording to achieve high remanance. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains. This type of microstructural and crystallographic control is typically attempted by manipulating the deposition process, grooving the substrate surface and proper use of an underlayer.

If the uniformity of the grains in the underlayer structure is improved, this uniformity propagates to the uniformity of the grains in the magnetic layer or layers, thereby achieving high. SNR. However, such uniformity must be effected without disturbing the crystallographic orientation of the magnetic grains. This objective is not easily achieved.

There exists a continuing need for high areal density longitudinal magnetic recording media exhibiting high coercivity and high SNR.

DISCLOSURE OF THE INVENTION

An advantage of the present invention is a magnetic recording medium for high areal recording density exhibiting low noise and high coercivity, with a magnetic layer or layers exhibiting a highly uniform grain size.

Additional advantages and features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising: a chromium-molybdenum-tantalum (CrMoTa) underlayer; and a magnetic layer over the underlayer, the magnetic layer having a uniform grain size with a standard deviation less than 0.4.

Embodiments of the present invention comprise a composite underlayer system containing a first Cr layer, e.g., elemental chromium, and a $Cr_{100-x-y}Mo_xTa_y$ layer thereon, wherein x is 1 to 12, e.g., 8 to 12, and y is 1 to 6, e.g., 2 to 4. Embodiments of the present invention further include magnetic recording media comprising a non-magnetic substrate, a seedlayer on the substrate, a Cr underlayer on the seedlayer, a CrMoTa underlayer on the Cr underlayer, an interlayer on the CrMoTa underlayer and a magnetic layer on the interlayer. Embodiments of the present invention further include anti-ferromagnetically coupled ferromagnetic films with a spacer layer, with or without an interface layer on one or both sides of the spacer layer positioned between the ferromagnetic layers.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

BRIEF DESCRIPTION OF THE DRAWINGS

In FIGS. 1 and 2, similar elements are denoted by similar reference characters.

DESCRIPTION OF THE INVENTION

Figure 1:
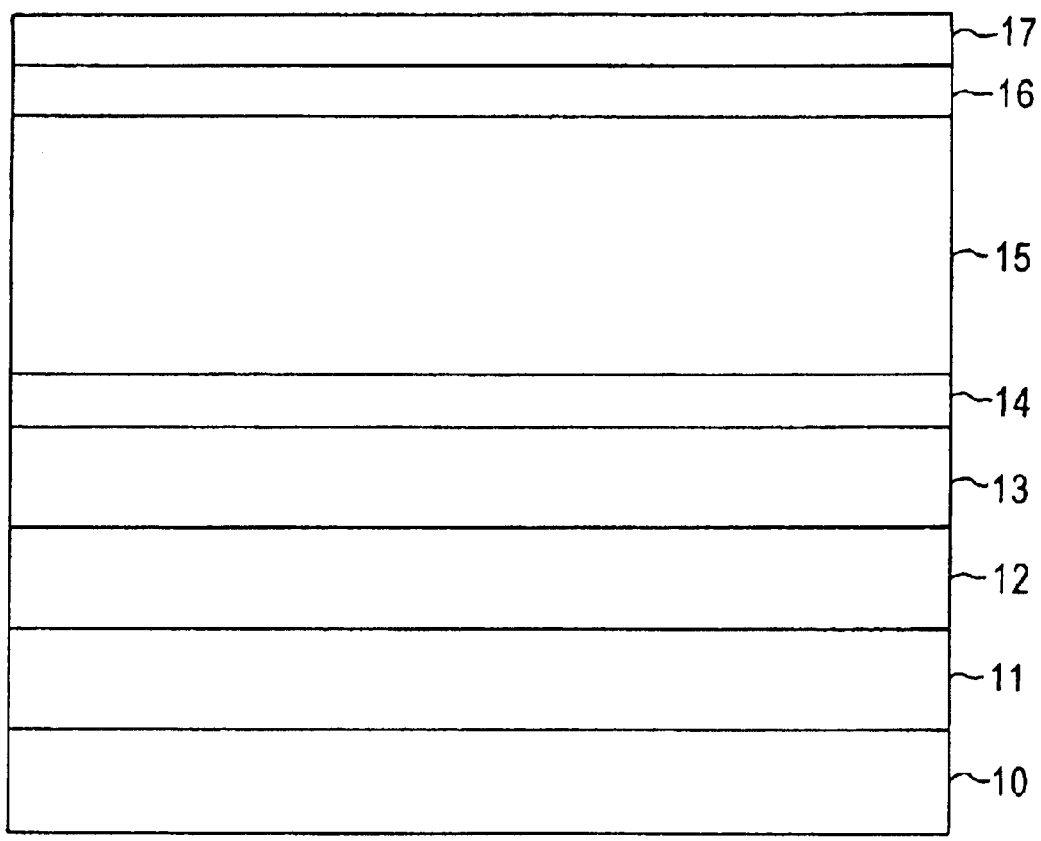
FIG. 1 schematically illustrates a magnetic recording medium in accordance with an embodiment of the present invention.

The present invention provides high areal recording density longitudinal magnetic recording media exhibiting high SNR and high coercivity. The present invention achieves such technological advantages by strategically formulating an underlayer structure of CrMoTa to significantly improve the uniformity of grains in the magnetic layer or layers and to achieve superior in-plane orientation of magnetic grains, thereby resulting in a significant improvement in SNR, e.g., of about 0.6 dB, and an improvement in bit error rate.

Embodiments of the present invention comprise the use of a $Cr_{100-x-y}Mo_xTa_y$ underlayer wherein x is 1 to 20 and y is 1 to 6. Advantageous results have been achieved wherein x is 2 to 4, e.g., 3, and y is 8 to 12, e.g., 10.

Conventional magnetic recording media are characterized by a magnetic layer with a grain size lacking the requisite uniformity to achieve high SNR. For example, conventional magnetic recording media typically comprise magnetic layers having a grain size with a standard deviation of about 0.7 or 0.8, as for a grain size of 9 nm. The strategic use of a CrMoTa underlayer in accordance with embodiments of the present invention achieves an improvement in grain size uniformity over conventional magnetic recording media of greater than 50% without compromising crystallographic orientation. Embodiments of the present invention comprise magnetic recording media with a magnetic layer or layers having a grain size uniformity less than 0.4, e.g., less than 0.3.

The present invention is applicable to magnetic recording media having one or more ferromagnetic layers, e.g., ferromagnetic alloys of cobalt-chromium (CoCr), or alloys of CoCr with one or more elements such as platinum (Pt), tantalum (Ta), boron (B), molybdenum (Mo), ruthenium (Ru), silicon (Si), germanium (Ge), niobium (Nb), iron (Fe) and nickel (Ni). In other embodiments of the present invention, the magnetic layer comprises anti-ferromagnetically coupled ferromagnetic films with a spacer layer therebetween, with or without an interface layer on one or both sides of the spacer layer. Such ferromagnetic layers can comprise CoCr or an alloy of CoCr with one or more added elements, such as Pt, Ta, B, Mo, Ru, Si, Ge, Nb, Fe and Ni. The ferromagnetic layers can comprise the same alloy, and are typically spaced apart by a spacer layer consisting of a non-magnetic material, such as Ru, rhodium (Rh), iridium (Ir), Cr, copper (Cu), rhenium (Re), vanadium (V) and their alloys. The interface layers, which can be positioned on one or both sides of the spacer layer between the spacer layer and the ferromagnetic layers, typically have a large magnetic moment, with an Ms greater than 400 emu/cc, and typically consist of high moment elements, such as Fe, Co or their alloys with one or more elements such as Cr, Pt, Ta, B, Mo, Ru, Si, Ge, Nb and Ni.

Magnetic layers deposited in accordance with embodiments of the present invention typically have a thickness of about 90 Å to 100 Å. The anti-ferromagnetically coupled embodiments of the present invention typically have a total magnetic layer thickness of 150 Å to 200 Å.

Embodiments of the present invention comprise a conventional non-magnetic substrate, such as an aluminum-magnesium alloy, or a glass, glass-ceramic or ceramic substrate. A sequence of layers is then provided on both sides of the substrate in a conventional manner, as by sputter deposition. In accordance with embodiments of the present invention, a non-magnetic seedlayer, such as amorphous nickel-phosphorous or CrTa or a fine grained material such as nickel-aluminum (NiAl) or chromium-titanium (CrTi), is then formed on the substrate, as at a thickness of 10 Å to 200 Å. A first underlayer is then formed on the seedlayer, such as elemental chromium, at the thickness of 30 Å to 80 Å. The CrMoTa underlayer is then deposited thickness of 30 Å to 80 Å. An interlayer is then formed on the CrMoTa underlayer, as at a thickness of 10 Å to 20 Å. The interlayer can comprise a non-magnetic or magnetic alloy, such as CoCr, or CoCr with one or more added elements, such as Pt, B, Ta and Ru. A magnetic layer is then formed on the interlayer. As in conventional practices, a protective overcoat, such as a carbon-containing protective overcoat, is then formed on the magnetic layer, and a lubricant topcoat formed on the protective overcoat.

A magnetic recording medium in accordance with an embodiment of the present invention is schematically illustrated in FIG. 1 and comprises substrate 10, seedlayer 11 formed thereon, Cr underlayer 12 and CrMoTa underlayer 13 which serves to refine the grain size and maintain uniformity in the subsequently deposited magnetic layer 15 after depositing interlayer 14. Underlayer 13 can be represented by the formula $Cr_{100-x-y}Mo_xTa_y$, wherein x is 1 to 20 and y is 1 to 6, such as x is 8 to 12 and y is 2 to 4, e.g., x is 10 and y is 3. Carbon-containing protective overcoat 16 and lubricant topcoat 17 are then deposited. It should be understood that layers 11 through 17 are sequentially deposited on both sides of the substrate 10. Advantageously, magnetic recording media in accordance with the present invention can be manufactured using an in-line, pass-by sputtering system wherein layers are sequentially sputtered deposited on the substrate.

Figure 2:
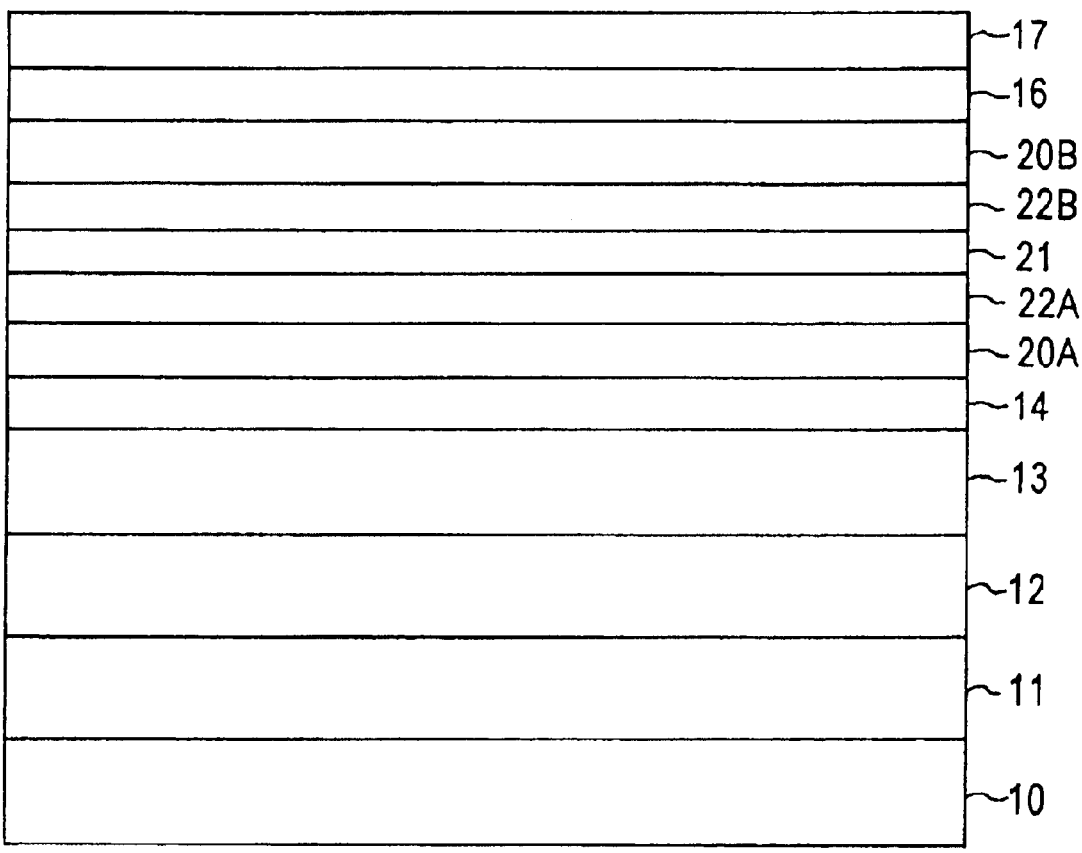
FIG. 2 schematically illustrates a magnetic recording medium in accordance with another embodiment of the present invention.

Another embodiment of the present invention is schematically illustrated in FIG. 2 and contains layers 11 through 14, 16 and 17 corresponding to those of magnetic recording medium depicted in FIG. 1. The magnetic recording illustrated in FIG. 2 differs from that illustrated in FIG. 1 in that the magnetic layer comprises anti-ferromagnetically coupled ferromagnetic layers 20A and 20B separated by a spacer layer 21 with interface layers 22A and 22B between the spacer layer 21 and first and second ferromagnetic layers 20A and 20B.

Experimental testing was conducted to demonstrate the advantageous improvement in grain size uniformity and in-plane orientation of magnetic grains attendant upon the strategic use of a CrMoTa underlayer in accordance with embodiments of the present invention resulting in increased SNR and improved bit error rate. A static sputtering processing was implement using an Intevac MDV 250-B marketed by Intervac Inc. of Santa Clara, Calif. Media designs were sputtered on Al/NiP substrates with a circumferencial mechanical texture thereon. The magnetic layers comprise an anti- ferromagnetically coupled structure of ferromagnetic layers of Co, Cr, Pt and B, with a Ru spacer layer therebetween at a thickness of about 0.6 to 0.8 nm. A carbon-containing protective overcoat of 35 Å was applied using magnetron sputtering for corrosion protection. The SNR was measured for linear densities of up to 600 kfci.

Figure 3A:
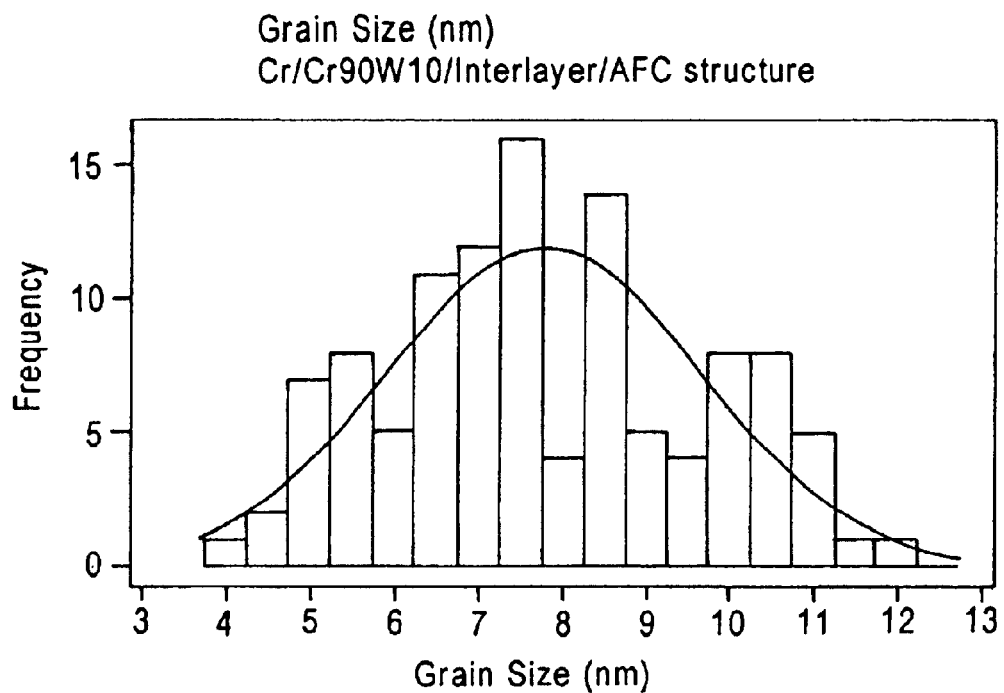
FIGS. 3A and 3B graphically illustrate the improved in grain size uniformity distribution of the present invention vis-à-vis a conventional underlayer structure.
Figure 3B:
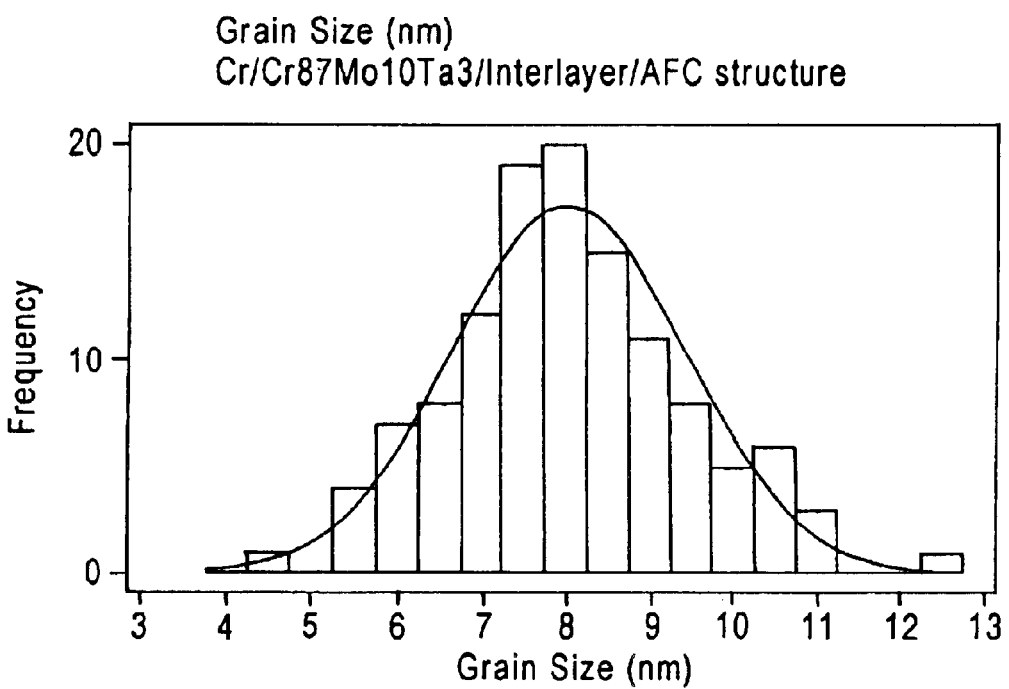

FIGS. 3A and 3B compare grain size distributions for two anti-ferromagnetically coupled recording media designs. The magnetic recording medium of FIG. 3A was manufactured with a Cr/CrW underlayer structure; whereas, the magnetic recording media of FIG. 3B was fabricated with a Cr/CrMoTa underlayer structure. It should be apparent from a comparison of FIGS. 3A and 3B that the medium with the Cr/CrMoTa underlayer structure in accordance with the present invention exhibited a more uniform grain size distribution. Measurements reveal that the Cr/Cr$_{90}$W$_{10}$interlayer/AFC structure of the FIG. 3A medium had a mean grain size of 8.07 nm with a standard deviation of 0.86. However, the Cr/Cr$_{87}$Mo$_{10}$Ta$_{3}$/interlayer/AFC structure of the FIG. 3B medium in accordance with an embodiment of the present invention had a mean grain size of 8.00 nm, with a standard deviation of 0.39.

Figure 4:
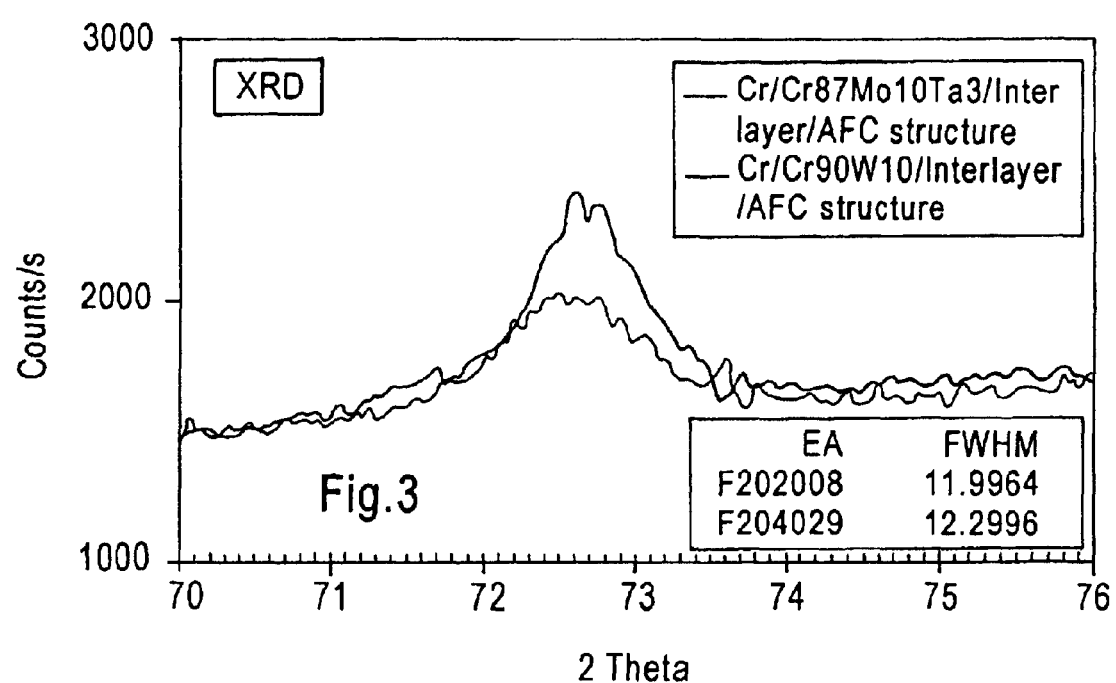
FIG. 4 represents X-ray defraction measurements illustrating in-plane orientation of the c axis in the inventive media.

Further experimental testing included X-ray diffraction measurements (XRD) which reveal a significant increase of (11–20) diffraction peaks in media with an CrCr$_{87}$Mo$_{10}$Ta$_{3}$ underlayer structure, which is indicative of superior in-plane orientation of the c-axis vis-à-vis the medium with the Cr/Cr$_{90}$/W$_{10}$ underlayer structure. The XRD measurements are shown in FIG. 4.

Magnetic property measurements were taken comparing the tested media with different underlayer structures and are reported in Table 1 below. The measurements show that media with the CrCr$_{87}$Mo$_{10}$Ta$_{3}$ underlayer structure exhibit superior uniformity in grain size distribution and in-plane orientation of magnetic grains resulting in increased SNR and improved bit error rate. In Table 1, "ASYM" represents low frequency peak asymmetry and "eSDR" represents equilized signal to distortion ratio.

The strategic use of a CrMoTa underlayer structure in accordance with embodiments of the present invention enables a significant improvement in grain size uniformity of the magnetic layer or layers and superior in-plane orientation of magnetic grains resulting in an increase in SNR and improvement in bit error rate. The present invention enjoys industrial applicability in manufacturing various types of high areal density longitudinal recording media exhibiting low noise and improve magnetic properties, including anti-ferromagnetically coupled type media. Magnetic recording media in accordance with the present invention are not limited to any particular substrate material, seedlayer, interlayer, magnetic layers, protective overcoats or lubricant topcoats.

Only certain embodiments of the present invention and but a few examples of its versatility are shown and described in the present disclosure. It is to be understood that the present invention is capable of using various other combinations and in environments, and is capable of changes and modifications within the scope of the inventive concept as expressed herein.

What is claimed is:

1. A magnetic recording medium comprising:
   a chromium-molybdenum-tantalum (CrMoTa) underlayer; and
   a magnetic layer over the underlayer, the magnetic layer having a uniform grain size with a standard deviation less than 0.4, wherein:
   the magnetic layer comprises:
      a first ferromagnetic layer;
      a spacer layer on the first ferromagnetic layer; and
      a second ferromagnetic layer on the spacer layer.

2. The magnetic recording medium according to claim 1, wherein the CrMoTa underlayer is Cr$_{100-x-y}$Mo$_x$Ta$_y$, and wherein x equals 1 to 20 and y equals 1 to 6.

3. The magnetic recording medium according to claim 2, wherein: x is 9 to 11; and y is 2 to 4.

4. The magnetic recording medium according to claim 2, wherein the magnetic layer has a uniform grain size with a standard deviation less than 0.3.

5. The magnetic recording medium according to claim 1, wherein the magnetic layer further comprises:
   an interface layer between the spacer layer and the first ferromagnetic layer; and/or
   an interface layer between the spacer layer the second ferromagnetic layer.

6. The magnetic recording medium according to claim 5, wherein the interface layer or layers have a magnetic moment (Ms)>400 emu/cc.

7. The magnetic recording medium according to claim 6, wherein the interface layer or layers comprise iron, cobalt, or an alloy of iron or cobalt with one or more elements selected from the group consisting of chromium, platinum, tantalum, boron, molybdenum, ruthenium, silicon, germanium, niobium and nickel.

TABLE 1

|  | LF AMP (mV,0-p) | MF AMP | ASYM (%) | Ovw (dB) | PW50 (uin) | Read Width (uin) | Write Width (uin) | OTC Err Floor | PE Err Floor | eSNR Time (dB) | eSNR Freq (dB) | Elec eSNR Time (dB) | Elec eSNR Freq (dB) | Media eSNR Time (dB) | Media eSNR Freq (dB) | eSDR (dB) |
|---|---|---|---|---|---|---|---|---|---|---|---|---|---|---|---|---|
| Cr/Cr$_{90}$W$_{10}$/ | 578 | 403 | 2 | 29.4 | 4.10 | 4.63 | 7.60 | −5.57 | −6.38 | 13.61 | 14.24 | 19.42 | 18.70 | 14.94 | 16.17 | 22.71 |
|  | 611 | 436 | 2 | 29.0 | 4.04 | 4.65 | 7.47 | −5.73 | −6.35 | 13.56 | 14.25 | 19.82 | 19.37 | 14.74 | 15.85 | 22.85 |
|  | 595 | 420 | 2 | 29.2 | 4.07 | 4.64 | 7.53 | −5.65 | −6.36 | 13.6 | 14.2 | 19.6 | 19.0 | 14.8 | 16.0 | 22.8 |
| Cr/Cr$_{87}$Mo$_{10}$Ta$_{3}$/ | 577 | 425 | 2 | 31.0 | 3.94 | 4.60 | 7.42 | −6.12 | −6.69 | 14.06 | 14.65 | 20.29 | 19.75 | 15.25 | 16.26 | 23.38 |
|  | 624 | 432 | 1 | 30.5 | 4.01 | 4.69 | 7.66 | −6.18 | −6.82 | 14.13 | 14.58 | 20.14 | 19.78 | 15.38 | 16.14 | 23.41 |
|  | 600 | 428 | 2 | 30.7 | 3.97 | 4.64 | 7.54 | −6.15 | −6.75 | 14.1 | 14.6 | 20.2 | 19.8 | 15.3 | 16.2 | 23.4 |

8. The magnetic recording medium according to claim 1, wherein the spacer layer comprises ruthenium, rhodium, iridium, chromium, copper, rhenium, vanadium or an alloy thereof.

9. The magnetic recording medium according to claim 1, wherein the first ferromagnetic layer comprises cobalt-chromium or a cobalt-chromium alloy containing one or more elements selected from the group consisting of platinum, tantalum, boron, molybdenum, ruthenium, silicon, germanium, niobium, iron and nickel.

10. The magnetic recording medium according to claim 1, wherein the first ferromagnetic layer and the second ferromagnetic layer comprise essentially the same alloy.

11. The magnetic recording medium according to claim 1, wherein the magnetic layer comprises cobalt-chromium or a cobalt-chromium alloy containing one or more elements selected from the group consisting of platinum, tantalum, boron, molybdenum, ruthenium, silicon, germanium, niobium, iron and nickel.

12. A magnetic recording medium comprising:
    a non-magnetic substrate;
    a seedlayer on the non-magnetic substrate:
    a chromium underlayer on the seedlayer;
    a chromium-molybdenum-tantalum (CrMoTa) underlayer on the chromium underlayer;
    an interlayer on the CrMoTa underlayer; and
    a magnetic layer on the interlayer, the magnetic layer having a uniform grain size with a standard deviation less than 0.4.

13. The magnetic recording medium according to claim 12, wherein the seedlayer comprises amorphous nickel-phosphorous, amorphous chromium-tantalum, nickel-aluminum or chromium-titanium.

14. The magnetic recording medium according to claim 12, wherein the interlayer is a non-magnetic or magnetic alloy comprising cobalt-chromium or a cobalt-chromium alloy with one or more elements selected from the group consisting of platinum, boron, tantalum and ruthenium.

15. The magnetic recording medium according to claim 12, wherein the magnetic layer comprises:
    a first ferromagnetic layer;
    a spacer layer on the first ferromagnetic layer; and
    a second ferromagnetic layer on the spacer layer.

16. The magnetic recording medium according claim 14, wherein the magnetic layer further comprises:
    an interface layer between the spacer layer and the first ferromagnetic layer; and/or
    an interface layer between the spacer layer and the second ferromagnetic layer.

17. The magnetic recording medium according to claim 15, wherein the interface layer or layers have a magnetic moment (Ms) greater than 400 emu/cc.

18. The magnetic recording medium according to claim 16, wherein the interface layer or layers comprise iron, cobalt or an alloy of iron or cobalt with one or more elements selected from the group consisting of chromium, platinum, tantalum, boron, molybdenum, ruthenium, silicon, germanium, niobium, and nickel.

19. The magnetic recording medium according to claim 1, wherein the CrMoTa underlayer has a thickness of 30 Å to 80 Å.

* * * * *